US006810035B1

(12) United States Patent
Knuutila et al.

(10) Patent No.: US 6,810,035 B1
(45) Date of Patent: Oct. 26, 2004

(54) METHOD AND ARRANGEMENT FOR THE PARALLEL UTILIZATION OF DATA TRANSMISSION CHANNELS

(75) Inventors: Jarno Knuutila, Tampere (FI); Jari Hämäläinen, Kangasala (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/478,876

(22) Filed: Jan. 7, 2000

(30) Foreign Application Priority Data

Jan. 11, 1999 (FI) .................................................. 990036

(51) Int. Cl.⁷ .............................................. H04B 7/00
(52) U.S. Cl. .................................................... 370/354
(58) Field of Search ................................. 370/352, 353, 370/354, 310, 328, 329; 455/557, 575

(56) References Cited

U.S. PATENT DOCUMENTS

| | | | | |
|---|---|---|---|---|
| 6,026,086 A | * | 2/2000 | Lancelot et al. | 370/353 |
| 6,112,084 A | * | 8/2000 | Sicher et al. | 370/337 |
| 6,122,263 A | * | 9/2000 | Dahlin et al. | 370/329 |
| 6,256,513 B1 | * | 7/2001 | Minamida | 455/557 |
| 6,314,302 B1 | * | 11/2001 | Haferbeck et al. | 455/550.1 |
| 6,347,091 B1 | * | 2/2002 | Wallentin et al. | 370/437 |
| 6,374,112 B1 | * | 4/2002 | Widegren et al. | 455/452.2 |
| 6,385,451 B1 | * | 5/2002 | Kalliokulju et al. | 455/437 |
| 6,438,383 B1 | * | 8/2002 | Hall et al. | 455/458 |
| 6,463,054 B1 | * | 10/2002 | Mazur et al. | 370/352 |
| 6,487,595 B1 | * | 11/2002 | Turunen et al. | 709/226 |
| 6,631,259 B2 | * | 10/2003 | Pecen et al. | 370/314 |
| 6,650,889 B1 | * | 11/2003 | Evans et al. | 455/418 |

FOREIGN PATENT DOCUMENTS

| | | |
|---|---|---|
| GB | 2301992 | 12/1996 |
| WO | WO 98/57482 | 12/1998 |
| WO | WO 98/57509 | 12/1998 |
| WO | WO 99/16266 | 4/1999 |
| WO | WO 00/70893 | 11/2000 |

OTHER PUBLICATIONS

"The Proposal Of Wireless Multimedia Communication System With Integration Of Packet–Switched and Circuit–Switched Channels", Oono et al., IEEE Globecom, vol. 1, pp. 120–125, 1998.

* cited by examiner

Primary Examiner—Min Jung
(74) Attorney, Agent, or Firm—Perman & Green, LLP

(57) ABSTRACT

A wireless terminal arrangement acts as a communicating party in a multimedia connection consisting of real time service components and non-real time service components. The real time service components are to be utilized by local real time applications (206, 207) and the non-real time service components are to be utilized by local non-real time applications (205). A radio transceiver (204) is capable of both circuit-switched and packet-switched operation. A real time channel block (202) is used for conveying the real time service components between the local real time applications (206, 207) and the radio transceiver, and a non-real time channel block (203), connected in parallel with said real time channel block, is used for conveying the non-real time service components between the local non-real time applications (205) and the radio transceiver.

11 Claims, 6 Drawing Sheets

METHOD AND ARRANGEMENT FOR THE PARALLEL UTILIZATION OF DATA TRANSMISSION CHANNELS

TECHNOLOGICAL FIELD

The invention concerns generally the technology of arranging data transmission between at least two terminals of a telecommunication system. Especially the invention concerns the technology of arranging for an optimally dimensioned channel solution for multimedia connections consisting of components characterised by various capacity needs.

BACKGROUND OF THE INVENTION

Multimedia in general is understood as the synchronised presentation of audiovisual objects to a human user. At the priority date of this patent application it is expected that the concept of a conventional telephone call will evolve towards a point-to-point (or point-to-multipoint, or multipoint-to-multipoint) multimedia connection, in which each user has a terminal with audiovisual capabilities and the telecommunication system connecting the terminals will communicate various kinds of audiovisual material as well as plain digital data between the terminals. At the same time a clear tendency is seen towards more and more portable telecommunication terminals. A simple example of a portable multimedia terminal is a mobile video telephone, the user of which is able to view a video image of his conversation partner while listening him to talk. It is typical to multimedia connections that the amount of data to be transmitted may vary considerably according to which kind of imaging subsystems are used, what other data is there to be transmitted in addition to the video image, and what kind of data compression, encryption and channel coding schemes are employed.

Most mobile telecommunication systems are cellular radio systems by structure. The capacity bottleneck of the majority of them is the radio path between the mobile terminal and one or more fixed base stations, where time and bandwidth are scarce. Known telecommunication standards and proposals for standards are ill suited for the optimization of capacity usage on the radio path concerning multimedia connections, mostly because their channel allocation mechanisms are inflexible. For example the recommendation number H.324 of the ITU-T (International Telecommunication Union—Telecommunication Standardization Sector) calls for the multiplexing of all different data streams (audio, video and data) into a single transmission channel, which has typically a capacity of 28.8 kbps and is provided through a modem according the V.34 standard or through a transparent HSCSD (High Speed Circuit Switched Data) transceiver in the GSM system (Global System for Mobile telecommunications). The capacity allocated for a single multimedia connection is therefore fixed, which dictates that if the demands of one component data stream increase, the other components must surrender some capacity. Even a minor increase in the amount of simultaneously transmitted data may cause considerable degradation in the quality of e.g. video images, which will in turn cause annoyance to the communicating parties.

SUMMARY OF THE INVENTION

The object of the present invention is to provide a method and arrangement for setting up and maintaining a multimedia connection that would allow for flexible changes in the amount of transmitted data per time unit and/or bandwidth. It is also an object of the invention to provide a method and arrangement for effectively using the resources of the radio interface between a mobile terminal and a base station for communicating information related to a multimedia connection.

The objects of the invention are achieved by a parallel arrangement of a real time channel and a non-real time packet channel which is closely associated to the real time channel.

The method according to the invention is characterised in that it comprises the steps of
 directing the information related to real time service components through a radio transceiver, and between said radio transceiver and the local real time applications through a real time channel block and
 directing the information related to non-real time service components through the same radio transceiver, and between said radio transceiver and the local non-real time applications through a non-real time channel block connected in parallel with said real time channel block.

The invention also applies to a wireless terminal arrangement for acting as a communicating party in a multimedia connection consisting of real time service components and non-real time service components, of which the real time service components are to be utilized by local real time applications and the non-real time service components are to be utilized by local non-real time applications. It is characterised in that it comprises
 a radio transceiver capable of both circuit-switched and packet-switched operation,
 a real time channel block for conveying the real time service components between the local real time applications and the radio transceiver and
 a non-real time channel block, connected in parallel with said real time channel block, for conveying the non-real time service components between the local non-real time applications and the radio transceiver.

Additionally the invention applies to a telecommunication system which is characterised in that it comprises
 a circuit-switched telecommunication network for conveying, between the terminals, information relating to real time service components and
 a separate packet-switched telecommunication network for conveying, between the terminals information relating to non-real time service components parallelly with the information relating to the real time service components.

According to the invention a mobile multimedia terminal will comprise parallel arrangements for the communication of real time and non-real time information. Real time information is most advantageously related to audio and video, real time data and/or system control applications. Non-real time information may relate to any data the communication of which is not time-critical. Typical examples of non-real time information is the data representing a still image, a text file, a binary file or even low-bitrate commands like far end camera control commands.

To comply with existing standards it is advantageous to compose the parallel real time and non-real time arrangement of components that have been previously specified. At the time of filing this patent application a promising candidate for the real time part is a functionality according to the H.324 and GSM HSCSD standards, whereas GPRS (General Packet Radio Service) or even) SMS (Short Message Service) is suitable for implementing the non-real time part.

The transceiver of the mobile terminal must be able to handle both the real time and non-real time part of the connection. Allowing for simultaneous activity by both parts is advantageous and can be realised for example with an HSCSD/GPRS GSM transceiver of Class A; however, a specific prioritizing arrangement may be applied if the transceiver is a HSCSD/GPRS GSM transceiver of Class B or other transceiver that only allows for one of the parts to be active at a given moment.

As a part of an advantageous embodiment of the invention, the usage of the radio resources is optimized by activating the required radio bearers only according to need. Therefore the multimedia connection according to the invention will not keep any radio resources unnecessarily reserved, which helps to avoid congestion in the radio access networks and saves electric energy which is important in portable battery-driven terminals. A user of a wireless terminal gains the advantage in the form of reduced communication costs, because the invention will enable the (generally more expensive) real time radio bearers to be involved only when they are necessary: non-real time services may be provided through (cheaper) non-real time radio bearers.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

Like parts in the Figs. have been designated with same reference designators.

DETAILED DESCRIPTION OF THE INVENTION

Figure 1:
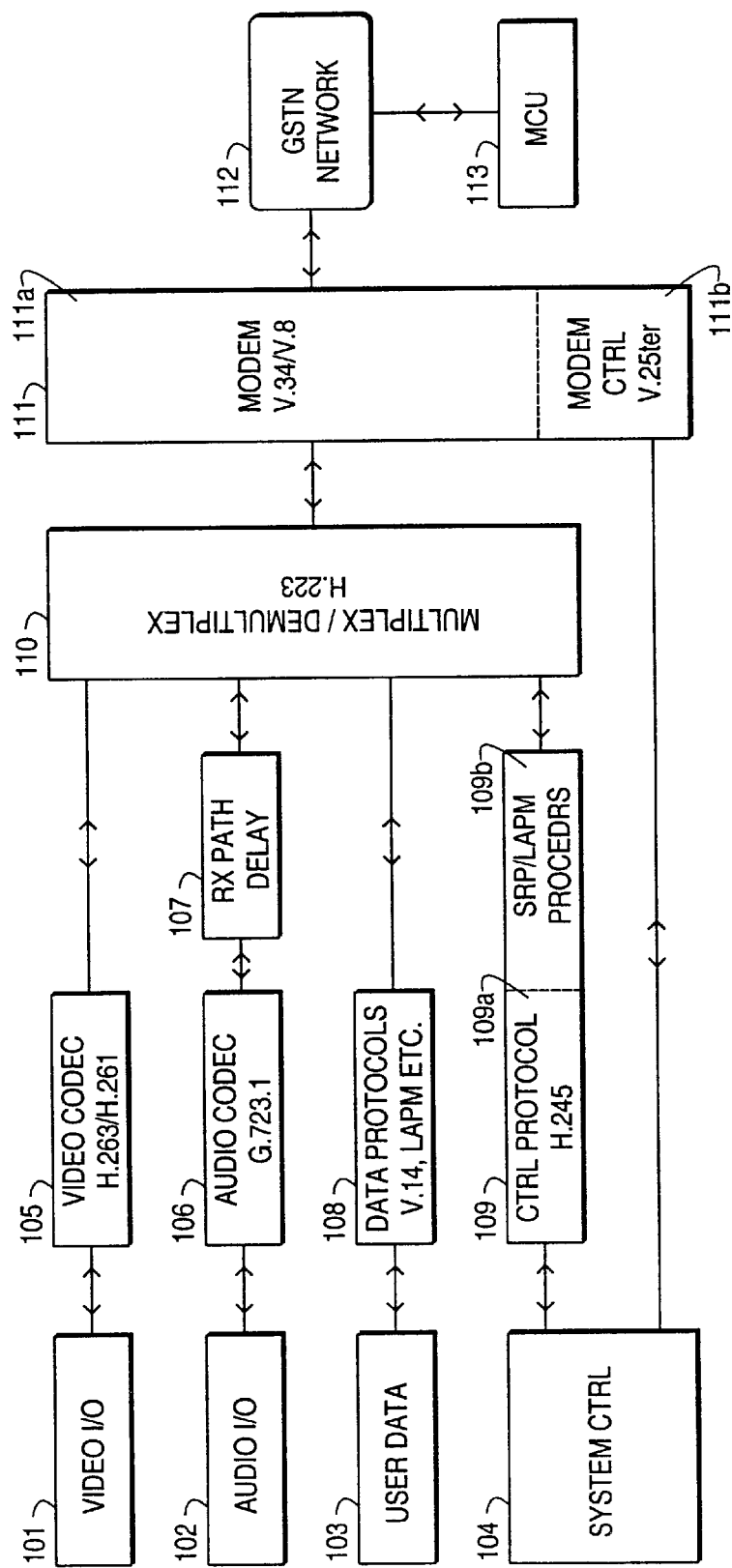
FIG. 1 illustrates a known arrangement according to the H.324 standard.

As additional background of the invention the known terminal arrangement according to the H.324 standard will first be discussed with reference to FIG. 1. The standard specifies four possible sources and sinks of information: video input and/or output equipment 101, audio input and/or output equipment 102, user data applications 103 and system control 104. Inputted video information to be transmitted is encoded and received video information to be outputted is decoded in the video codec block 105, which itself conforms to the known standards H.263 or H. 261. Inputted audio information to be transmitted is correspodingly encoded and received audio information to be outputted is correspodingly decoded in the audio codec block 106, which conforms to the known standard G.723.1. An optional delay block 107 provides for any necessary delay in the received audio signal to synchronize it with the received video signal. A rather generally defined data protocol block 108 will implement the necessary encoding and/or decoding functions for transferring the data related to the userdata applications.

The role of the system control block 104 relates both to the operation of the terminal itself and to the realisation of any necessary end-to-end system functions. The terminal comprises, coupled to a first system control port, a block 109 that consists of a control protocol part 109a and a SRP/LAPM part (Simple Retransmission Protocol/Link Access Procedures for Modems) 109b. Of these the former operates according to the known standard H.245 that provides end-to-end signalling for proper operation of the terminals, and signals all other end-to-end system functions. It provides for capability exchange, signalling of commands and indications, and messages to open and describe the content of logical channels. The SRP/LAPM part 109b is an intermediate layer in the control channel protocol stack between the H.245 layer and the multiplexing/demultiplexing block 110 and it implements either a simple retransmission protocol, where each transmitted frame must be acknowledged before the transmission of next such frame is allowed, or the LAPM protocol as defined in the known V. 42 standard.

The multiplexing/demultiplexing block 110 performs the multiplexing function from separate video, audio, data and control streams into a single stream to be transmitted, and correspondingly the demultiplexing function from a received stream to separate video, audio, data and control streams. To those media types where applicable it also performs logical framing, sequence numbering, error detection and error correction by retransmission. The modem block 111 consists of a modem proper 111a and a control/sensing subblock 111b. The modem is basically a two-way converter for performing the necessary conversions between the digital information handled inside the terminal and the analog signal that can be transmitted over a telephone network. It operates according to the known standards V.34 or V.8N.V.8bis. In the latter case the control/sensing subblock 111b is used to provide the necessary control/sensing functions of the modem/network interface according to the known standard V.25ter. It has a direct connection to a second system control port and further to the system control block 104.

The H.324 standard sets very few requirements to the General Switched Telephone Network (GSTN) 112 that will offer the link between two terminals like that in FIG. 1. Multipoint communication is to be accomplished with the help of Multipoint Control Units (MCU) 113 connected to the telephone network.

It should be noted that the H.324 standard allows for a wide variety of both real time and non-real time data application to operate within the user data applications block 103. As standardised data applications the standard mentions T.120 for point-to-point and multipoint audiographic teleconferencing including database access, still image transfer and annotation, application sharing, real time file transfer etc., T.84 point-to-point still image transfer cutting across application borders, T.434 point-to-point telematic file transfer cutting across application borders, H.224 for real time control of simplex applications, including H.281 far end camera control, network link layer, as per ISO/IEC (International Standardization Organisation/International Electrotechnical Commission) TR9577, T.30 facsimile transfer and T.140 text conversation protocol.

The standard also allows for the transmission of unspecified user data from external data ports. Other applications and protocols than those mentioned may be used, if that their use can be negotiated as specified in the H.245 standard.

The ITU-T standards H.324, V.34, H.263, H.261, G.723.1, H.245, V.42, V.8, V.8bis, V.25ter and V.110 are incorporated into this patent application by reference.

Figure 2:
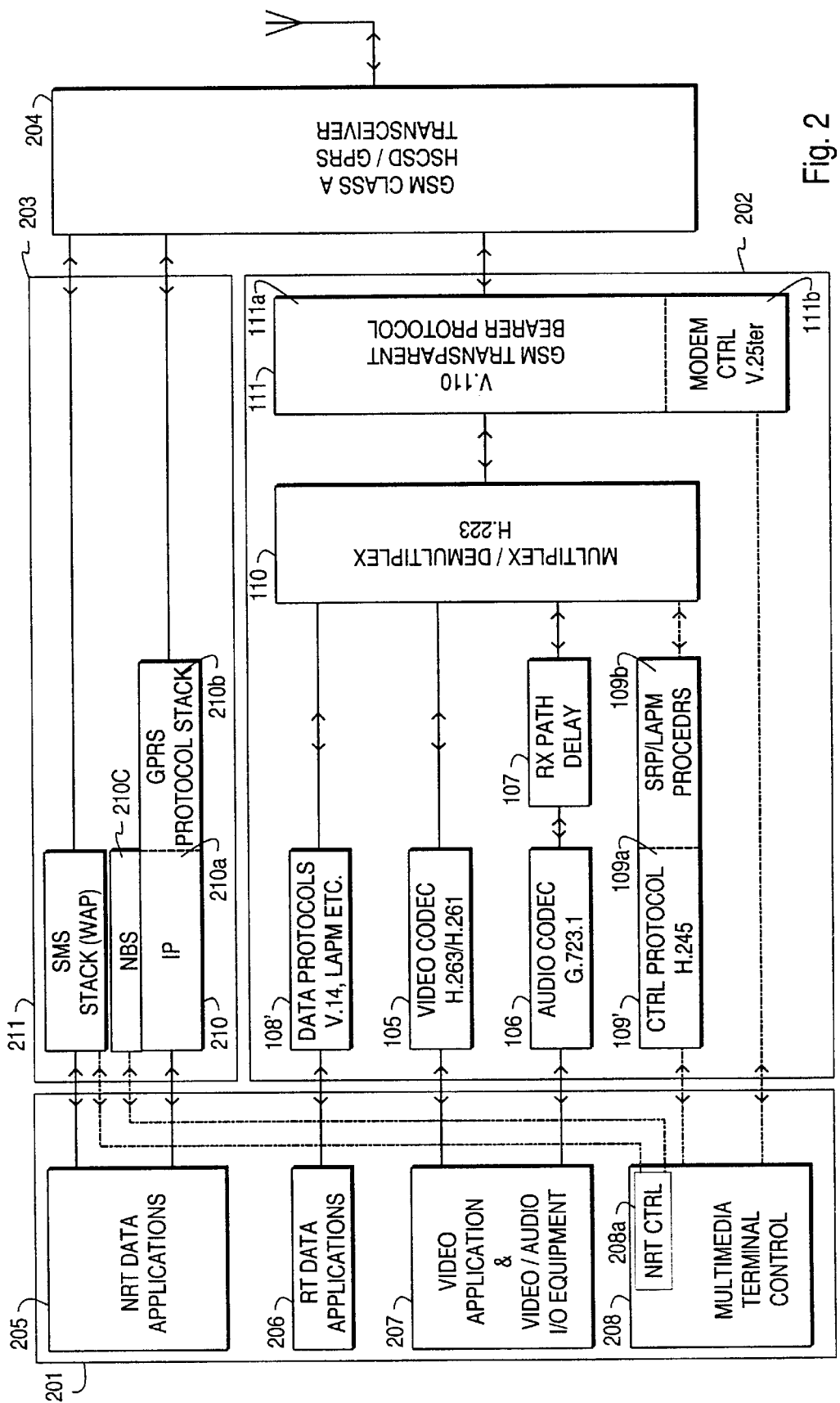
FIG. 2 is a block diagram of a terminal according to the invention.

FIG. 2 illustrates an advantageous terminal according to the invention. A large part of it consists of blocks and connections that are similar to the corresponding blocks in FIG. 1, but their functions are partly different. In order to illustrate the at least partial equivalence, the same reference designators are used for the similar parts.

The terminal arrangement of FIG. 2 consists of a multimedia applications block 201, a real time channel block 202, a non-real time channel block 203 and a transceiver block 204. The division into blocks is functional and does not require that the functions illustrated within the same block should be implemented within a single device. Neither does the division into blocks exclude some functions illustrated in different blocks from being implemented within a single device.

The applications block 201 comprises a NRT data block 205 which represents all such applications that source and/or sink non-real time data, and a RT data block 206 which represents all such applications that source and/or sink real time data. Together the blocks 205 and 206 can be seen to roughly correspond to the user data applications block 103 in FIG. 1. Additionally the applications block comprises a video/audio application and I/O equipment block 207 that approximately corresponds to a combination of the blocks 101 and 102 in FIG. 1, and a system control block 208 with a separate non-real time control part 208a.

The blocks 206, 207 and 208 communicate with the real time channel block 202 so that the RT data block 206 is coupled to the data protocol block 108', the video part (not separately shown) of block 207 is coupled to the video codec block 105, the audio part (not separately shown) of block 207 is coupled to the audio codec block 106 and the system control block 208 is coupled both to the control protocol part 109a of block 109 and to the control/sensing subblock 209b of the data adapter block 209. Inside the real time channel block 202 the organisation and work distribution of blocks 105, 106, 107, 108', 109', 110 and 209 is similar to that of blocks 105, 106, 107, 108, 109, 110 and 111 in FIG. 1 with the exceptions that the data protocol block 108' is only arranged to implement real time data protocols, the control protocol block 109' is adapted to handle some signalling according to the invention and a data adapter block 209 according to the known standard V.110 replaces the modem block 111; replacing a modem with a data adapter signifies that the telecommunication network that is to provide the communication connection between terminals is digital and not analog. Connections associated with data flows have been shown with solid lines and connections associated with control flows are represented by broken lines.

The NRT d at a block 205 does not have a connection to the data protocol block 108' and indeed not to the real time channel block 202 at all. There is, in parallel with the real time channel block 202, a separate non-real time channel block 203 where the NRT data block 205 is coupled to both a packet protocol block 210 and a short message service or SMS block 211. The former of these comprises an IP (Internet Protocol) subblock 210a, a GPRS subblock 210b and a NarrowBand Socket subblock 210c.

The transceiver 204 is capable of communicating both circuit-switched information with the data adapter 209 in the real time channel block 202 and packet-switched information with the SMS and packet protocol blocks of the non-real time channel block 203. In FIG. 2 it has been assumed that the transceiver is an HSCSD/GPRS GSM transceiver of Class A, which means that it supports simultaneous GPRS and HSCSD bearers. Later we will show how the invention is applicable in connection with a transceiver that only supports one bearer type at a time.

Previously we have seen that the service components of a multimedia connection may be divided into the real time and non-real time categories. According to the invention the real time channel block 202 provides for a certain transmission capacity to the use of the real time service components, and the varying capacity needs of the non-real time service components are satisfied by the non-real time channel block 203. The use of parallel real time and non-real time arrangements guarantees that the real time service components do not have to surrender any capacity to the non-real time service components, at least as long as the transceiver supports simultaneous real time and non-real time activity.

In the design of the terminal arrangement according to FIG. 2 it has been assumed that the mapping of different applications to either SMS, GPRS or HSCSD bearers is fixed, i.e. an application that is specified to use for example an SMS bearer may not use a part of the capacity in the real time channel through the data protocol block 108' even when such capacity was otherwise left free. A further enhancement to the embodiment of FIG. 2 would be a system where a separate "data agent" would keep track of the capacity allocated to the real time data channel and its usage. If the data agent would notice, at a moment when the need for transmitting some non-real time data arises, that there is unused capacity in the real time data channel, it could redirect the non-real time data to be transmitted to the real time data channel instead of the preliminarily specified non-real time data channel. A simpler enhancement would be the one where the division to real time and non-real time service components is fixed, but an application preliminarily targeted for GPRS could also use SMS as a secondary alternative or vice versa.

In any case it is assumed that the system control block 208 includes the necessary functions for administering the bearer set-up and tear-down processes so that during a multimedia communication session only those bearers are maintained in active state at each moment that are necessary. If, for example, the multimedia connection is a video telephone connection with initially no associated non-real time data, the system control block would arrange for the set-up of only an HSCSD bearer. Only if there arises, in the middle of the video telephone connection, the need for transmitting a text file or some other non-real time information between the communicating parties, the system control block would arrange for the set-up of a GPRS bearer. Similarly the system control block could arrange for an SMS message with far end camera control commands within it to be sent only after the user has indicated his will to control the far end camera; it may be that no such need arises at any phase of the video telephone connection. A very simple connection could be handled through GPRS and/or SMS bearers only with no need to set up an HSCSD bearer.

For some packet radio systems there have been defined separate active and idle states for a packet radio connection.

This means that a packet radio terminal may initially register to the service of a base station, meaning that a packet radio bearer is intially set up, but as long as there is no actual data to be transmitted the connection remains in an idle state where it consumes a very small amount of the radio resources or no radio resources at all. Only at the moment when the need for actual data transmission arises will the idle connection be upgraded to an active state for the duration of the actual data transmission. Thereafter it will return to the idle state to wait for either a new period of actual data transmission or a complete tear-down. This procedure is advantageously adopted in the invention so that a packet radio bearer is always initially set up when a terminal according to the invention is camping in a cell that can offer multimedia services, and the state of the packet radio connection is independent of the state of potential simultaneous real time connections.

The ETSI (European Telecommunications Standards Institute) technical specification number GSM 02.60 Phase 2+, which is incorporated herein by reference, defines a Class B transceiver in the following way: "Supports simultaneous attach, simultaneous activation and simultaneous monitor. Supports only limited simultaneous invocation: GPRS virtual circuits (GPRS-activation) shall not be cleared down due to invocation or traffic of circuit switched services, the status of the GPRS virtual connection is then "busy or held". Simultaneous traffic shall not be supported. The mobile user can make and/or receive calls on either of the two services sequentially but not simultaneously. The selection of the approriate service is performed automatically." In other words, if the transceiver 204 of FIG. 2 is a Class B transceiver, it will prioritize real time services and handle non-real time services only when there is no real time activity.

In order to enhance the applicability of a Class B transceiver the operation of the system control block 208 may be augmented (or a completely new functional block may be added) to implement a so-called Service Prioritization Agent, if the network offers support for such an arrangement. The purpose of such an agent would be to arrange for the alternating use of the real time and non-real time services according to a certain Service Priority Profile, which may be either fixed or definable by the user. The Service Priority Profile could state for example that if there arises, during an active real time transmission, the need for transmitting a piece of non-real time data, the real time transmission shall be interrupted for the maximum duration of X milliseconds, where X is a parameter with a selectable value. Suitable forms for the Service Priority Profile may be obtained through experimenting.

It should be noted that the specifications for GSM real time (circuit-switched) connections known at the time of filing this patent application do not allow for the connection to be put on "hold" in the manner described above. Therefore, if the transceiver is of Class B, there is a contest principle for reserving the transmission channel between the real time and non-real time services and once a real time service has made a reservation it can not be interrupted. On the other hand it is possible to put a non-real time service on hold if there suddenly arises a need for providing real time service to some application.

As one specific example of a terminal arrangement according to the invention we may consider the combination of a mobile telephone and a laptop computer or other auxiliary device where applications are running on top of a multimedia protocol like H.324. According to the H.324 specification in such an arrangement the auxiliary device will only communicate with the mobile telephone through a single multiplexed data flow which may contain both real time and non-real time components. It is possible to apply the invention so that the mobile will intelligently (=according to need) maintain real time and non-real time bearers over the radio interface to a base station, and take care of the necessary mappings of the components of the data flow so that there is a mapped correspondence between the real time components and the real time bearer(s) on one hand and between the non-real time components and the non-real time bearer(s) on the other. A prior art arrangement would only use a real time bearer for transmitting the whole multiplexed data flow. If the requirements of the H.324 specification may be relaxed, there may be separate (non-multipexed) connections between the mobile telephone and the auxiliary device for real time and non-real time data flows.

Figure 3:
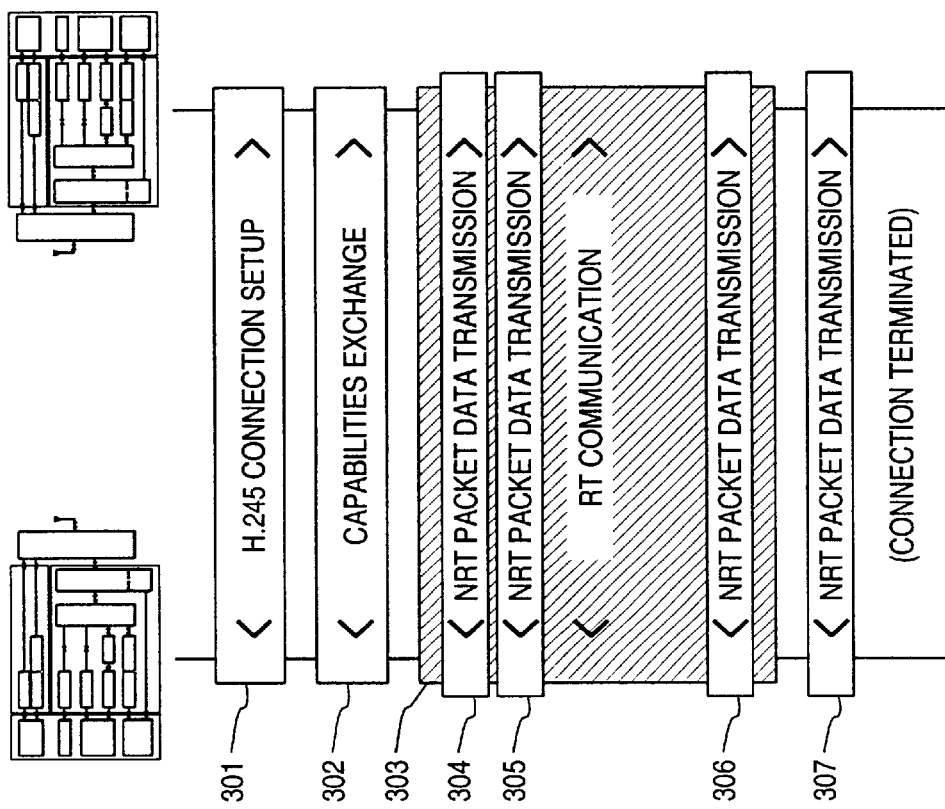
FIG. 3 illustrates a method according to the invention.

Next we will describe an advantageous method according to the invention with reference to FIG. 3. We will assume that the connection to be used is a simple point-to-point multimedia connection between two terminals like that in FIG. 2. Later we will make some generalisations that show the applicability of the invention to point-to-multipoint or multipoint-to-multipoint connections.

Block 301 illustrates the known connection setup procedures according to the H.245 standard. It is followed by block 302 which represents a capabilities exchange. A certain form of capabilities exchange has been previously described in section 6.5.1 of the H.324 standard; the capabilities exchange according to the invention differs from the known procedures in that the terminals indicate to each other their capability of (simultaneously) handling real time and non-real time services by the parallel channel arrangement seen in FIG. 2. One suitable way for implementing such indications is the NonStandardParameter structure defined in the H.245 standard. A certain non-standard message may be generally associated with the meaning that it indicates the parallel real time/non-real time capability. It is very advantageous to use an existing structure like the mentioned NonStandardParameter structure to indicate that the terminals have a capability according to the present invention, because this way the invention does not require any real amendments or additions to the existing standards. In other words, the signalling of H.324 external system capabilities is performed via H.245 procedures, i.e. utilizing H.324 internal signalling scheme.

As an alternative to the inclusion of the real time/non-real time capability indication to the general capabilities exchange 302 it is possible to define that the capabilities according to the invention are indicated over a non-real time channel by using packet or SMS services before the actual information exchange related to the multimedia connection will begin.

After the initial exchange of system capability information, the H.324 video telephony application and real time data applications use the real-time (HSCSD) channel, while the parallel transmission pipe (GPRS/SMS interface) is devoted to non-real time data applications. Block 303 illustrates an active real time connection, for example a video telephone connection. Every now and then there arises, during the active real-time connection, the need for parallelly exchanging non-real time data between the terminals. The corresponding short passages of transferred packet data and/or short messages are indicated as the blocks 304, 305 and 306. After the deactivation of the real time connection there may still be a passage of non-real time data exchange between the terminals as illustrated by block 307. Thereafter the connection is terminated.

The method according to FIG. 3 is easily generalised to a point-to-multipoint or multipoint-to-multipoint connection where a number of terminals have a pool of simultaneous connections. Each terminal keeps a record that describes the identity and capabilities of each other terminal taking part in the connection. In the connection set-up phase there is a round of capabilities exchanges where each terminal receives the capability information of the other terminals. A multipoint control unit in the network mediating the connections will arrange for the multipoint transmission channels and transmission schedules so that every piece of transmitted information reaches its intended destination with the minimum number of collisions. During the point-to-multipoint or multipoint-to-multipoint real time connection (s) an arbitrary number of point-to-point, point-to-multipoint or multipoint-to-multipoint non-real time connections may take place. Arranging for the required connections in the network is on the responsibility of the multipoint control unit. Similarly, if the non-real time connections are the dominant form of communication in the point-to-multipoint or multipoint-to-multipoint connections, they may be augmented with an arbitrary number of point-to-point, point-to-multipoint or multipoint-to-multipoint real time connections.

Figure 4:
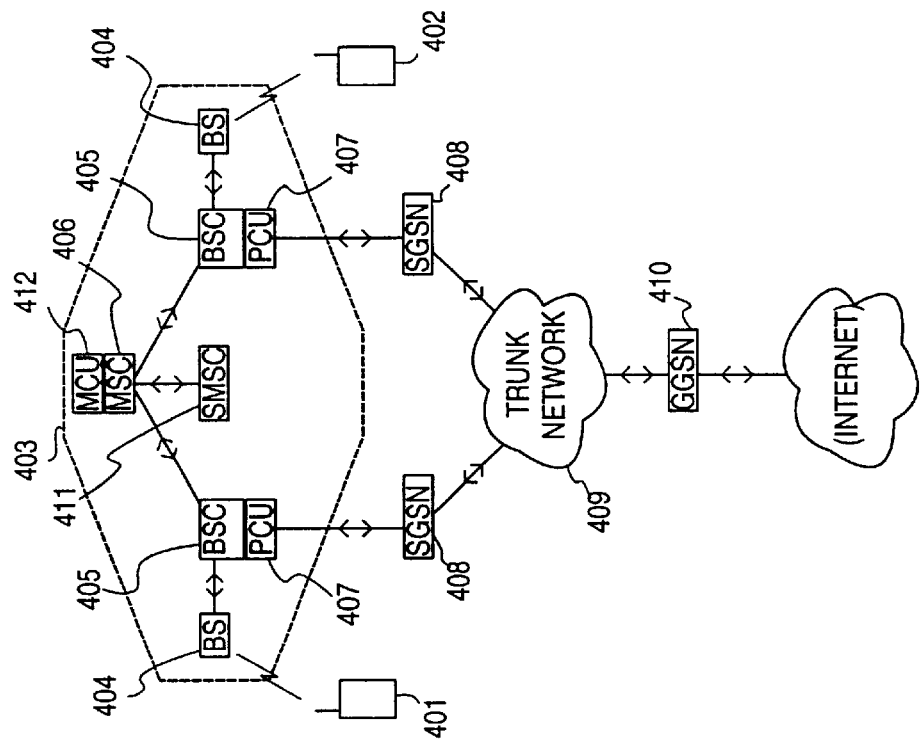
FIG. 4 is a schematic overview of a telecommunication system according to the invention.

FIG. 4 illustrates a telecommunication system where two terminals 401 and 402 are connected to a telecommunication network 403. The terminals 401 and 402 have the parallel real time/non-real time capabilities according to the invention, and the network 403 is equipped for transmitting telephone connections through base stations (BS) 404, base station controllers (BSC) 405 and mobile switching centres (MSC) 406. To enable the simultaneous transmission of packet data between the terminals the network comprises at least one Packet Control Unit (PCU) 407. There may be a PCU in each base station controller 405, from which there is a connection to a serving GPRS support node (SGSN) 408 within a packet transmission network. Alternatively a PCU may be situated in a base station or even in the SGSN. A trunk-line network 409 connects the serving GPRS support nodes to each other; there may also be gateway GPRS support nodes 410 through which there are connections to other packet data networks like the Internet. The real time connection goes from a terminal 401 through a base station 404, a base station controller 405, a mobile switching centre 406, another base station controller 405 and another base station 404 to the other terminal 402. The non-real time connection goes from a terminal 401 through a base station 404, a base station controller 405, the packet control unit 407 connected to the base station controller, a serving GPRS support node 408, the trunk-line network 409, another serving GPRS support node 408, another packet control unit 407, the base station controller 405 connected to the other packet control unit and another base station 404 to the other terminal 402. A short message services centre 411 is also coupled to the mobile switching centre so that potential SMS messages go through it according to known SMS routines. To arrange for the diverse multipoint connection alternatives there may be a multipoint control unit 411 connected to at least one mobile switching centre.

In the foregoing description we have referred primarily to a GSM network as the one transmitting the real time connections and a GPRS network as its non-real time counterpart. However, these references have no limiting effect upon the invention; indeed, the invention allows for any real time network and parallel non-real time network to be used. If simultaneous real time and non-real time operation is expected, the network(s) must support simultaneous real time and non-real time traffic.

We will conclude by briefly discussing some system implementation aspects. The multimedia terminal contol block 208 in FIG. 2 is responsible for the initialization of the capabilities exchange signalling which is needed for informing a remote terminal about the capabilities of the present terminal and/or requesting the corresponding capabilities of the remote terminal. As mentioned, it is possible to arrange this signalling to be done in at least two different ways, i.e. through H.245 signalling or through at least one of the non-real time pipes (GPRS, SMS).

Figure 5:
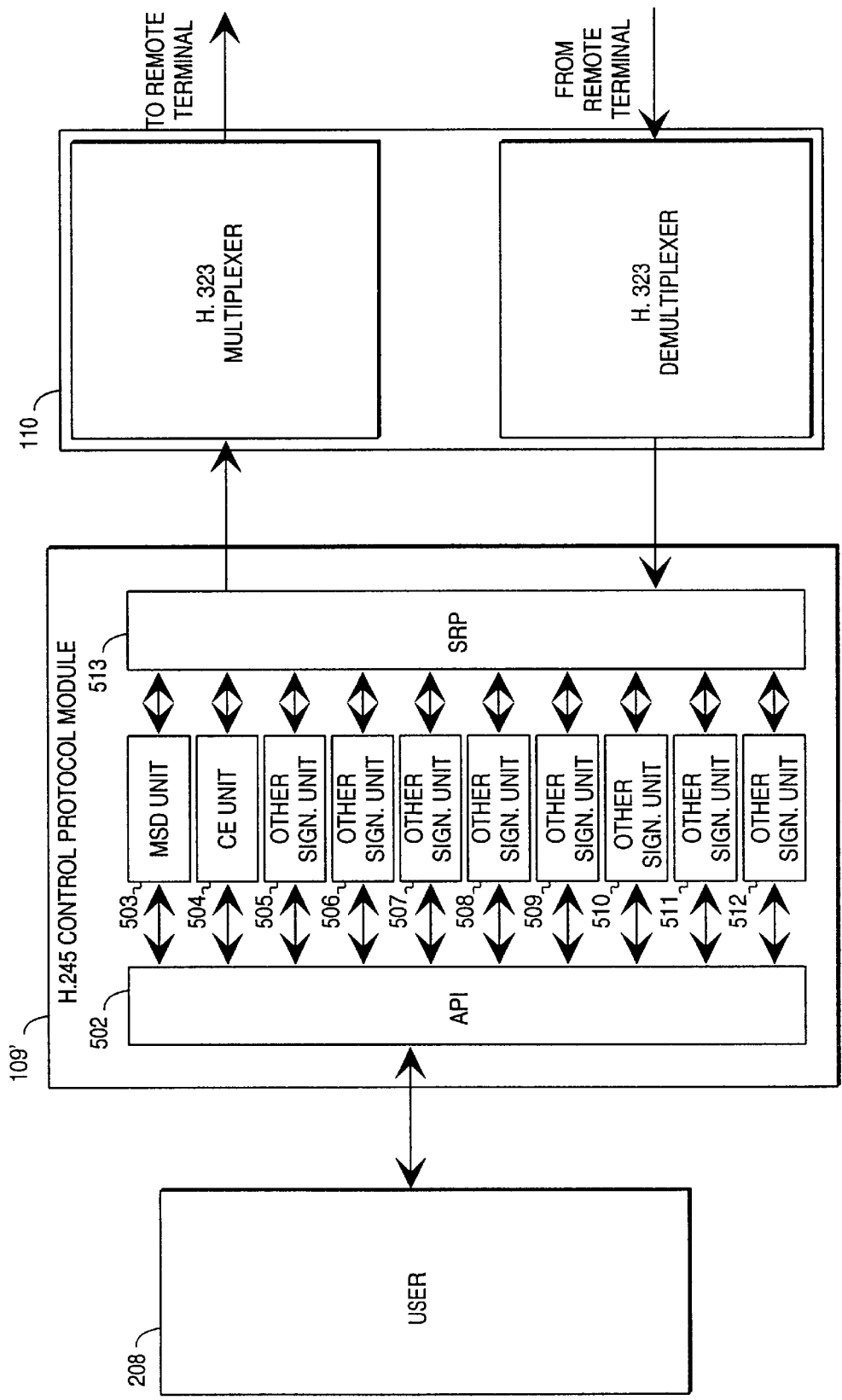
FIG. 5 shows a block diagram of the system for H.245 signaling according to the present invention.

FIG. 5 is related to the H.245 signalling alternative. A typical example of the H.245 control protocol module 109' adapted to the invention consists of the H.245 application programming interface (API) 502, several signalling units 503 to 512 and a simple retransmission protocol (SRP) 513. The H.245 control protocol module is usually called the H.245 module for brevity.

The H.245 API 502 provides the interface for using the H.245 module 109. The instance that uses the H.245 module is called the user. The main functionality provided by the H.245 API is the sending and receiving of control information messages called primitives. The H.245 API 502 also provides means for setting several parameters that have an effect on the operation of H.245 module.

The H.245 protocol contains several types of control negotiations. All the signalling done for a certain type of negotiation is called a signalling procedure. The entity that performs the signalling procedures of one kind is called a signalling unit (related to the term "signalling entity" used in H.245 recommendation). For instance, all the signalling in master-slave determination is called the master-slave determination procedure, and it is performed by the master-slave determination unit or MSD unit shown as 503 in FIG. 5.

Each signalling procedure unit consists of two parts. The part that has initiated the procedures, i.e. whose user has requested the negotiation, is called the out-going part. The part answering to a procedure initiated by the remote terminal is called the in-coming part. The out-going and in-coming part of the same H.245 module are independent of each other.

Under the H.245 protocol, there is an additional protocol called the simple retransmission protocol (SRP), specified in H.324 recommendation and designated as 513 in FIG. 5. The task of the SRP is to guarantee the secure transmission of the control frames by acknowledging every received uncorrupted frame and retransmitting those frames for which no acknowledgement has arrived.

The H.245 control protocol units of two connected terminals negotiate with H.245 messages. These messages are defined in the ASN.1 syntaxes of the H.245 recommendation. The actual bit stream presentation of the messages is achieved by encoding the ASN.1 type messages with packed encoding rules (PER). The H.245 control protocol and user communicate with what is called the primitives, which are to be distinguished from the H.245 messages. The primitives are known as request, response, rejection, indication, confirmation, release or failure primitives, depending on the role they have in the negotiation. Facilities for sending and receiving primitives will be implemented into the H.245 API.

With capabilities exchange procedures, the terminal states its receiving and possibly transmitting capabilities to the remote terminal. The knowledge about the other end's capabilities is essential in choosing viable modes of transmission. The capability exchange (CE) procedures are carried out by the capabilities exchange unit (CEU) 504.

Figure 6A:
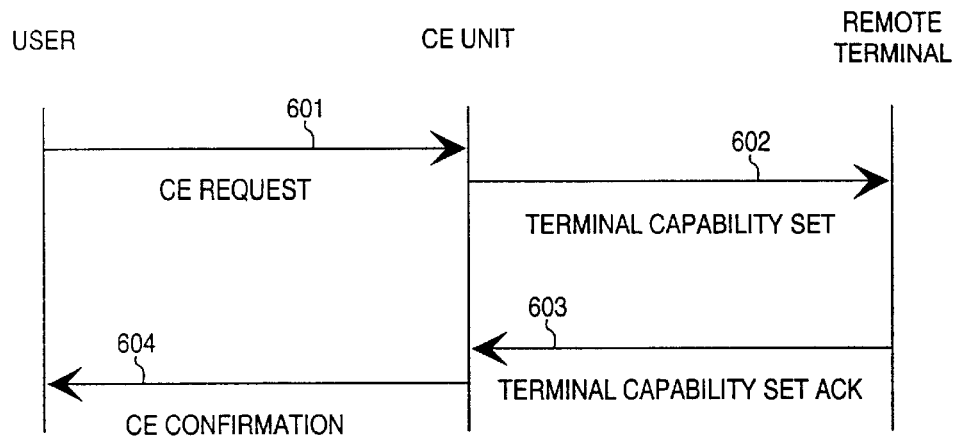
FIGS. 6a, 6b, and 6c show message transfers that occur as part of a signaling procedure capabilities according to the invention.
Figure 6B:
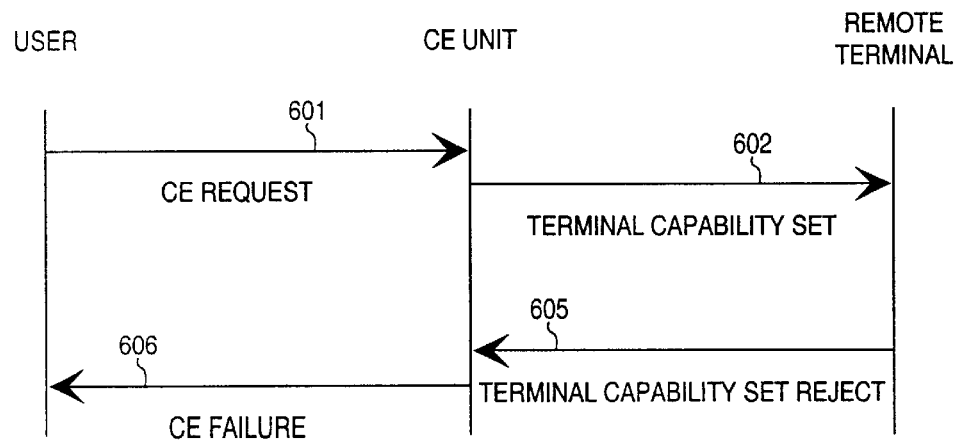
Figure 6C:
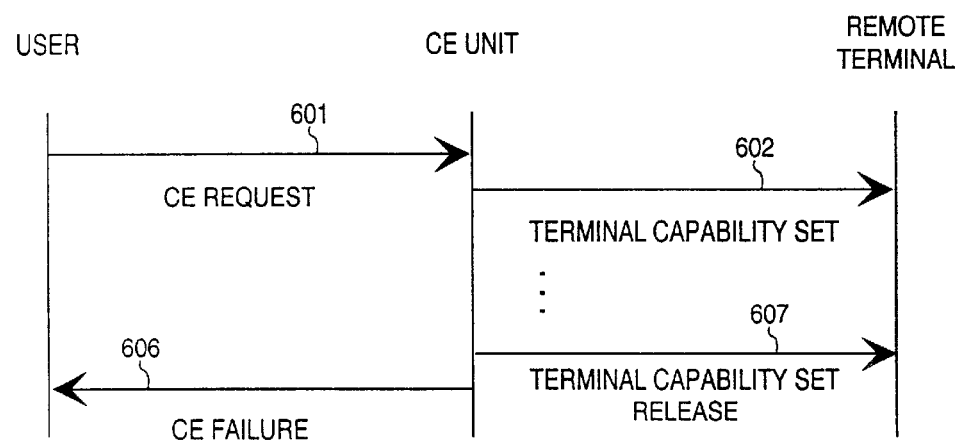

The user initiates a capabilities exchange by issuing the "CE request" primitive 601 as in FIGS. 6a, 6b and 6c. The CEU sends a "TerminalCapabilitySet" message 602 to the remote terminal, and waits for the remote terminal to respond. If the CEU receives a "TerminalCapabilitySetAck" message 603 from the remote terminal, the capabilities exchange has been successful and the user is informed with a "CE confirmation" primitive 604 as in FIG. 6a. If the CEU receives a "TerminalCapabilitySetReject" message 605 from the remote terminal, the capabilities exchange has been rejected and the user is informed with a "CE failure" primitive 606 as in FIG. 6b. If the CEU does not receive a response from the remote terminal within a certain time limit, the capabilities exchange has failed, the CEU sends a "TerminalCapabilitySetRelease" message 607 to the remote terminal, and the user is informed with with a "CE failure" primitive 606 as in FIG. 6c.

Figure 7A:
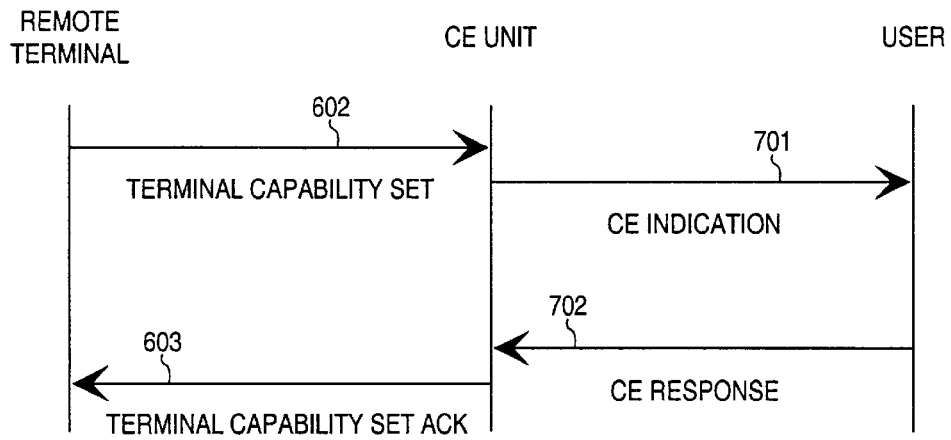
FIGS. 7a, 7b, and 7c show additional message transfers that may occur as part of the signaling procedure.
Figure 7B:
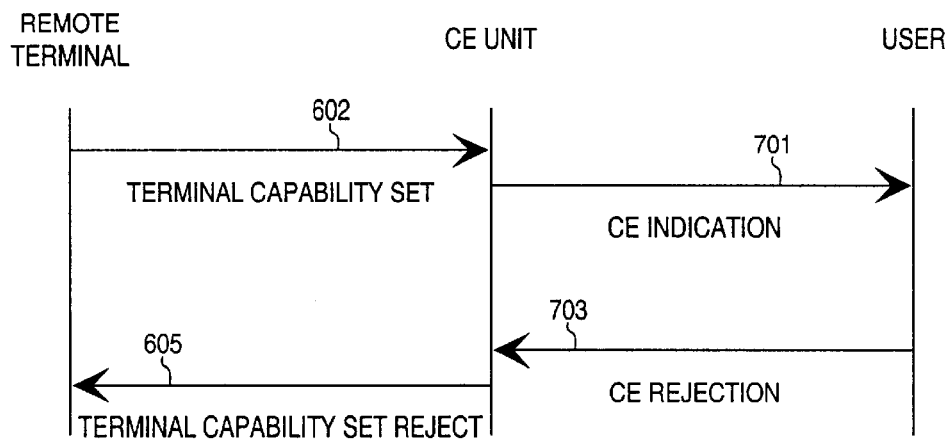
Figure 7C:
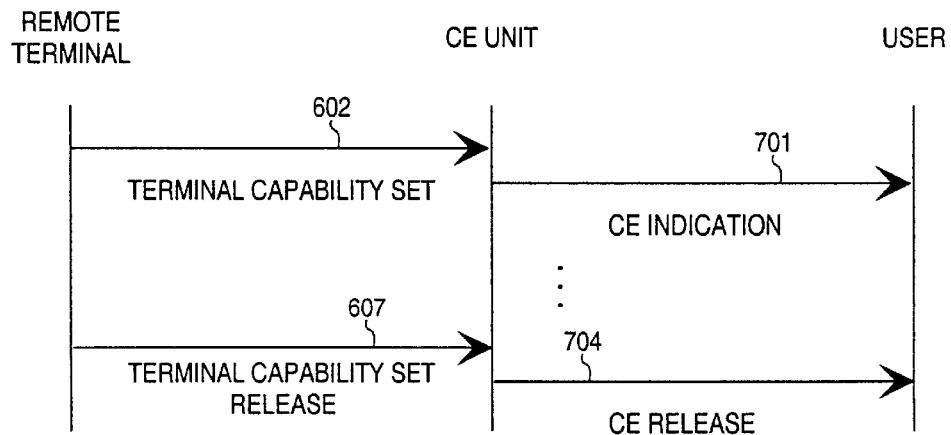

When a CEU receives a "TerminalCapabilitySet" message 602 as in FIGS. 7a, 7b and 7c, it informs the user with a "CE indication" primitive 701, and waits for the user to respond to the request. If the user accepts the request by issuing a "CE response" primitive 702, the CEU sends a "TerminalCapabilitySetAck" message 603 to the remote terminal as in FIG. 7a. If the user rejects the request by issuing a "CE rejection" primitive 703, the CEU sends a "TerminalCapabilitySetReject" message 605 to the remote terminal as in FIG. 7b. If the CEU receives a "TerminalCapabilitySetRelease" message 606 from the remote terminal while waiting for the user to respond, it issues a "CE release" primitive 704 to the user, and stops waiting as in FIG. 7c.

Non-standard capabilities and control messages may be issued using the NonStandardParameter structure defined in H.245 as mentioned previously. The signalling procedure is essentially the same as described above with reference to FIGS. 6a–7c. If a terminal receives a request, response or command that it does not understand, either because it is non-standard or has been defined in a later revision of the system specification than what the terminal supports, it should respond by sending a FunctionNotSupported message known as such.

If the SMS service is utilized for the capabilities exchange, the signalling can be done e.g. with the help of a narrow band socket (NBS) API and a so-called smart messaging protocol. The main idea is then to utilize the SMS service as a carrier for the signalling of the H.245 type which resembles that described above. If there is a possibility to run a SMS service on the top of GPRS, even the use of the packet-switched non-real time channel follows the same pattern.

Another alternative for using the packet-switched non-real time channel is that the required control messages are encapsulated in TCP/IP packets between terminals. The GPRS terminal address is analogous to an IP address. It uniquely identifies a device connected to the GPRS network. The port address is used within the terminal to identify the socket opened by an application which in this case is the terminal control application. In the future, the utilization of a GPRS carrier may be included also to a smart messaging protocol specification and a narrow band socket specification, hence enabling wider utilization of the methodology in question by the third party software developers and terminal manufacturers as well.

More information about narrowband sockets is available to the public in the form of network-published document at the address "http:H/www.forum.nokia.com/download/concepts/nbs/files/ nbs-spec.zip".

What is claimed is:

1. A wireless terminal arrangement for acting as a communicating party in a multimedia connection consisting of real time service components and non-real time service components, of which the real time service components are to be utilized by local real time applications and the non-real time service components are to be utilized by local non-real time applications, comprising a radio transceiver capable of both circuit-switched and packet-switched operation, a real time channel block for conveying the real time service components between the local real time applications and the radio transceiver and a non-real time channel block, connected in parallel with said real time channel block, for conveying the non-real time service components between the local non-real time applications and the radio transceiver.

2. A wireless terminal arrangement according to claim 1, wherein the radio transceiver is a HSCSD/GPRS GSM transceiver of Class A.

3. A wireless terminal arrangement according to claim 1, wherein the radio transceiver is a HSCSD/GPRS GSM transceiver of Class B, and the wireless terminal arrangement further comprises a prioritizing arrangement for arranging for the alternating use of the real time and non-real time service components according to a certain Service Priority Profile.

4. A wireless terminal arrangement according to claim 1, wherein the real time channel block comprises:

a video port for connecting to local video applications, an audio port for connecting to local audio applications, a real time data port for connecting to local real time data applications, a control port for connecting to system control functions, a multiplexer/demultiplexer for multiplexing and demultiplexing video, audio and real time data information as well as control information, a video codec between said multiplexer and said video port for encoding and decoding video information, an audio codec between said multiplexer and said audio port for encoding and decoding audio information, a data protocol block between said multiplexer and said real time data port for applying certain real time data protocols, a control protocol block between said multiplexer and said control port for applying certain control data protocols, and a data adapter for performing adaptations between the information format handled by said multiplexer and the information format handled by said radio transceiver.

5. A wireless terminal arrangement according to claim 4, wherein the real time channel block is a functionality according to the ITU-T H.324 recommendation.

6. A wireless terminal arrangement according to claim 1, wherein the non-real time channel block comprises:

a first non-real time data port for connecting to local non-real time data applications, a second non-real time data port for connecting to local non-real time data applications, a radio transceiver connection for connecting to said radio transceiver, a packet protocol block between said first non-real time data port and said radio transceiver connection for applying certain packet data protocols, and an SMS block between said second non-real time data port and said radio transceiver connection for performing adaptations between the information format handled by at least one local non-real time data application and a character string format.

7. A method for acting as a communicating party in a multimedia connection consisting of real time service components and non-real time service components, of which the real time service components are to be utilized by local real time applications and the non-real time service components are to be utilized by local non-real time applications, comprising the steps of directing the information related to the real time service components, through a radio transceiver, and between said radio transceiver and the local real time applications through a real time channel block and directing the information related to the non-real time service components through the same radio transceiver, and between said radio transceiver and the local non-real time applications through-a non-real time channel block connected in parallel with said real time channel block.

8. A method according to claim 7, further comprising the steps of setting up a communication connection with another communicating party, exchanging with the other communicating party information describing the capabilities of the communicating parties for utilizing real time service components and non-real time service components in the communication connection and simultaneously utilizing real time service components and non-real time service components in the communication connection.

9. A method according to claim 7, further comprising the steps of setting up a communication connection with another communicating party, exchanging with the other communicating party information describing the capabilities of the communicating parties for utilizing real time service components and non-real time service components in the communication connection and alternately utilizing real time service components and non-real time service components in the communication connection.

10. A telecommunication system for setting up and maintaining, between wireless terminals, multimedia connections consisting of real time service components and non-real time service components, comprising a circuit-switched telecommunication network for conveying, between the terminals, information relating to the real time service components and a separate packet-switched telecommunication network for conveying, between the terminals, information relating to the non-real time service components parallel with the information relating to the real time service components.

11. A telecommunication system according to claim 10, wherein said circuit-switched telecommunication network is a digital cellular telephone network and said separate packet-switched telecommunication network is a digital cellular packet radio network sharing the same base stations with said digital cellular telephone network.

* * * * *

UNITED STATES PATENT AND TRADEMARK OFFICE
CERTIFICATE OF CORRECTION

PATENT NO. : 6,810,035 B1 Page 1 of 1
APPLICATION NO. : 09/478876
DATED : October 26, 2004
INVENTOR(S) : Knuutila et al.

It is certified that error appears in the above-identified patent and that said Letters Patent is hereby corrected as shown below:

Col. 13, line 9, in Claim 7, after "of" insert -- : --.

Col. 13, line 11, in Claim 7, after "components" delete ",".

Col. 13, line 17, in Claim 7, delete "through-a" and insert -- through a --, therefor.

Col. 13, line 21, in Claim 8, after "of" insert -- : --.

Col. 14, line 2, in Claim 9, after "of" insert -- : --.

Col. 14, line 16, in Claim 10, after "comprising" insert -- : --.

Col. 14, lines 22-23, in Claim 10, delete "parallel" and insert -- parallelly --, therefor.

Signed and Sealed this

Twelfth Day of February, 2008

JON W. DUDAS
*Director of the United States Patent and Trademark Office*